United States Patent Office 3,408,201
Patented Oct. 29, 1968

3,408,201
MINK FOOD PRODUCT CONTAINING BILE AND SLAUGHTER HOUSE AND PACKING HOUSE BY-PRODUCTS
John R. Moyle, Rte. 3, Box 266, Anacortes, Wash. 98221
No Drawing. Filed Oct. 6, 1965, Ser. No. 493,552
8 Claims. (Cl. 99—7)

ABSTRACT OF THE DISCLOSURE

A food product for mink and other carnivorous animals produced by grinding and blending bile with slaughter house by-products.

The present invention relates to a food product for animals, and a method of preparing it. It pertains especially to food for mink and other carnivorous fur-bearing animals, so prepared as to improve its nutritious values.

The scarcity of wild animals has led to extensive operations in raising fur-bearing animals for their furs. In such enterprises, e.g. mink raising, the profitability of the operation, depends to a very large extent on the cost of the food which is used. Since mink are carnivorous animals, they will not thrive unless they are fed on high protein materials, some at least of which must be meat products. Obviously it is not economically feasible to feed good meat, of a type fit for human consumption, to animals of this type. It is common practice, however, to feed them slaughter house and packing house by-products, including the by-products of cattle, sheep, swine, and also of poultry and the like.

Unfortunately, in raising mink, it is found that a substantial proportion of the animals will not do well on the sort of slaughter house and packing house by-products usually available. Many of the animals cannot digest or otherwise derive full benefit from these materials. Some of these waste materials of by-products have considerable fat in them, and a large number of mink, although they may eat in large quantities, cannot digest this beneficially. As a result, certain ailments often develop in the mink, especially one which mink breeders call "straight gut." This ailment occurs where the mink eat excessive amounts of feed, but apparently derive no benefit from it. The reason apparently is that they cannot adequately digest the food, particularly if it is high in fat content. In such cases they do not grow but remain small, scrawny, and underdeveloped, merely consuming large quantities of food without any satisfactory progress in maturing.

According to the present invention, it is now possible to blend certain materials, hitherto largely wasted, also by-products of slaughter houses or packing houses, etc., in with the conventional products, such as the animal viscera and other parts of animals which are unfit for human consumption, so as to make the whole much more beneficial to the animals that consume it. With this improved product the mink will eat less total food while they derive much greater benefits from it. They grow more rapidly and develop better bodies and finer furs; as a result the economics of mink ranch operations are very considerably improved.

More specifically, according to this invention, it has been discovered that by blending a small but controlled proportion of bile, which is obtained in considerable quantities from the liver and associated parts of cattle and sheep in slaughter houses, with the other by-products, the food becomes much more beneficial to the animals. It is known, of course, that bile has certain useful and essential properties which aid digestion of certain foods in human beings as well as in other animals. As far as applicant is aware, however, it had not been appreciated, until the present invention was made, that by deliberately using suitable proportions of bile and blending it thoroughly into the other by-product meats, the whole of the by-products fed to mink become much more beneficial to the animals. The ailments mentioned above disappear rapidly and quite completely.

Preferably, the bile is blended and thoroughly mixed by appropriate grinding and mixing equipment with other viscera or animal by-products of proteinaceous content. Even though considerable quantities of fat may be present, along with proteins, the food is still edible and beneficial to the animals. An optimum blend appears to require about one and one-half percent by weight of bile, based on the proteinaceous meat products with which it is blended. However, these proportions are not highly critical, and may be somewhat smaller or larger. Generally, the proportions will be not less than one-half percent and not more than 5% of bile, and preferably within limits of about 1% to 2% by weight.

It is quite important that the bile be thoroughly mixed and blended with the other ingredients of the food. Obviously, materials which are not entirely of meat or which are not of animal origin, but which contain nutritious and edible ingredients for the carnivorous animals may be used. Thus certain proteinaceous vegetable products, including some of those derived from soy beans, grains, cereals and the like, may be incorporated in reasonable proportions into the mixture. Basically, however, it is desirable that the food be largely meat. The bile which is blended into it this way does not ordinarily make the food objectionable in taste but usually makes it more palatable as well as aiding the animals in digesting it and obtaining full growth benefit from the products.

It will be understood also, that various other materials can be introduced into the product, including ingredients commonly added to the slaughter house and packing house by-products. This invention contemplates for example, the inclusion of obvious medicaments, food supplements, mineral components, vitamins, etc., such as are well known in industry.

As pointed out above, also, materials of this kind may be used for feeding other carnivorous animals such as foxes, otters, cats, and other animals that are carnivorous and are raised in quantity for their valuable pelts. Even smaller carnivorous animals will benefit from using bile in their proteinaceous or meat product and by-product food materials.

It is intended by the claims which follow to cover the various modifications which will suggest themselves to those skilled in the art as broadly as the prior art properly permits.

What is claimed is:
1. A food product for mink and other carnivorous animals, comprising proteinaceous by-products of slaughter houses and packing houses, such as viscera and the like, ground and blended with proportions of about 0.5 to 5% by weight of bile to improve their digestability and enhance their growth producing effect on the animals.
2. Product according to claim 1 wherein the bile and the proteinaceous by-products are finely ground and thoroughly blended together.
3. Product according to claim 1 wherein the bile content is between about 1 and 2% by weight, based on the total product.
4. Product according to claim 1 wherein the bile content is about 1½% by weight, based on the total product.

5. Product according to claim 1 wherein additional nutritional elements are added.

6. The method of improving the digestability of meat by-products such as viscera and the like for carnivorous fur-bearing animals which comprises blending into said meat products about 0.5 to 5% by weight of animal bile.

7. Method according to claim 6 wherein the product also contains non-meat proteinaceous ingredients.

8. Method according to claim 6 wherein the product also contains added vitamins.

No references cited.

A. LOUIS MONACELL, *Primary Examiner.*

N. ROSKIN, *Assistant Examiner.*